US009653830B1

(12) United States Patent
Chiu et al.

(10) Patent No.: US 9,653,830 B1
(45) Date of Patent: May 16, 2017

(54) EXTENDING DEVICE FOR SIGNAL TRANSMISSION AND MAINBOARD ASSEMBLY

(71) Applicant: GIGA-BYTE TECHNOLOGY CO., LTD., New Taipei (TW)

(72) Inventors: Shih-Chieh Chiu, New Taipei (TW); Chi-Chen Huang, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 14/950,489

(22) Filed: Nov. 24, 2015

(30) Foreign Application Priority Data

Oct. 30, 2015 (TW) ............................ 104135823 A

(51) Int. Cl.
*H05K 1/11* (2006.01)
*G06F 1/18* (2006.01)
*H01R 12/73* (2011.01)

(52) U.S. Cl.
CPC .................................... *H01R 12/73* (2013.01)

(58) Field of Classification Search
CPC .... H05K 1/11; H05K 1/14; G06F 1/18; G06F 1/185; H01R 23/7068; H01R 23/725; H01R 23/722; H01R 9/096
USPC .... 439/62, 65; 361/736, 737, 790, 788, 803, 361/796–802
See application file for complete search history.

(56) References Cited

U.S. PATENT DOCUMENTS 6,261,104 B1 * 7/2001 Leman .................... G06F 1/184 439/61
9,298,228 B1 * 3/2016 Abhyankar ............. G06F 1/185
2003/0049948 A1 * 3/2003 Kim ......................... H05K 1/14 439/61
2007/0197056 A1 * 8/2007 Huang .................... G06F 1/185 439/74
2009/0111295 A1 * 4/2009 Li .......................... H01R 12/52 439/78
2009/0147492 A1 * 6/2009 Heinrichs .............. G06F 1/185 361/784
2011/0250766 A1 * 10/2011 Chiu .................... H01R 12/737 439/65
2013/0128464 A1 * 5/2013 Chen ...................... H05K 7/026 361/721
2015/0347345 A1 * 12/2015 Hellriegel ............. G06F 13/409 710/301

* cited by examiner

*Primary Examiner* — Gary Paumen
(74) *Attorney, Agent, or Firm* — Jianq Chyun IP Office

(57) ABSTRACT

An extending device includes a first riser card, a signal coupling card and a second riser card. A first electric socket of the first riser card is disposed on a side surface of a first circuit board of the first riser card, and a first electric connector is disposed at an edge of the first circuit board. A second electric connector and a third electric connector of the signal coupling card are respectively disposed on both side surfaces of a third circuit board of the signal coupling card. The second electric connector inserts into the first electric socket. A second electric socket and an extending socket of the second riser are respectively disposed on both side surfaces of a second circuit board of the second riser. The third electric connector inserts into the second electric socket and the extending socket is electrically connected to the second electric socket.

13 Claims, 3 Drawing Sheets

100
120
124
114
110
112
122
130
116
210
200

200
110
112
114
124
116
130
120
210
100
122

EXTENDING DEVICE FOR SIGNAL TRANSMISSION AND MAINBOARD ASSEMBLY

CROSS-REFERENCE TO RELATED APPLICATIONS

This non-provisional application claims priority under 35 U.S.C. §119(a) on Taiwan Patent Application No. 104135823 filed on Oct. 30, 2015, the entire contents of which are hereby incorporated by reference.

BACKGROUND

Technical Field

This disclosure relates to expansion card connecting, and particularly, to an extending device for signal transmission and a mainboard assembly having this extending device.

Related Art

In a low profile computer chassis, such as a 1U server chassis, it is impossible to directly insert a high profile expansion card into an expansion socket of the computer. A riser-card assembly is required to have the expansion card be in parallel to the mainboard. The foregoing method can utilized for two or more expansion cards for the purpose of increasing the amount of expansion cards. Usually, the foregoing riser-card assembly includes a rise card with two sockets and a flexible flat cable that connects the mainboard with the rise card. The problems on the flexible flat cable are signal attenuation and signal interference easily. Further, the amount of sockets is also limited. Therefore, the foregoing riser-card assembly is still limited and inconvenienced while utilizing it.

In other approach, a customized mainboard equipped with horizontal sockets for expansion cards is used to arrange the expansion cards in parallel to the mainboard, and PCB of the mainboard has to be removed partially to evade expansion cards. However, such kind of customized mainboards lack for universality and cause the problem of stocks increasing.

SUMMARY

Accordingly, this disclosure is directed an extending device for signal transmission and a mainboard assembly having this extending device, to resolve the difficulty of expansion cards connecting in the art.

This disclosure provides an extending device for signal transmission, including a first riser card, a signal coupling card, and a second riser card.

The first riser card includes a first circuit board, a first electric socket, and a first electric connector. The first electric socket is disposed on a side surface of the first circuit board, and the first electric connector is disposed at an edge of the first electric circuit board.

The signal coupling card includes a third circuit board, a second electric connector, and a third electric connector. The second electric connector and the third electric connector are respectively disposed on two opposite edges of the third circuit board. The second electric connector is electrically connected to the third electric connector via the third circuit board, and the second electric connector is used for inserting into the first electric socket.

The second riser card includes a second circuit board, a second electric socket and at least one extending socket. The second electric socket and the extending socket are respectively disposed on both side surfaces of the second circuit board, the third electric connector of the signal coupling card is used for inserting into the second electric socket, and the extending socket is electrically connected to the second electric socket.

In one or more embodiment, the first electric connector is a terminal assembly independently disposed on the first electric circuit board or a card edge connector of the first electric circuit.

In one or more embodiment, the third circuit board is a printed circuit board.

In one or more embodiment, the second electric connector and the third electric connector are terminal assemblies independently disposed on the signal coupling card or card edge connectors of the signal coupling card.

In one or more embodiment, the first circuit board of the first riser card and the second circuit board of the second riser card are disposed in parallel, the third circuit board of the signal coupling card is perpendicular to the first circuit board and the second circuit board.

This disclosure also provides a mainboard assembly, including a mainboard and an extending device for signal transmission.

The mainboard includes a main socket.

The extending device for signal transmission includes a first riser card, a signal coupling card and a second riser card. The first rise card includes a first circuit board, a first electric socket, and a first electric connector; wherein the first electric socket is disposed on a side surface of the first electric connector, the first electric connector is disposed at an edge of the first circuit board for inserting into the main socket.

The signal coupling card includes a third circuit card, a second electric connector, and a third electric connector; wherein the second electric connector and the third electric connector are respectively disposed at two opposites edges of the third circuit board, and the second electric connector is electrically connected to the third electric connector via the third circuit board.

The second riser card includes a second circuit board, a second electric socket, and at least one extending sockets. The second electric socket and the extending sockets are respectively disposed on both side surfaces of the second circuit board, the third electric connector is used for inserting into the second electric socket, and the extending socket is electrically connected to the second electric socket.

In one or more embodiment, the first electric connector is a terminal assembly independently disposed on the first electric circuit board or a card edge connector of the first electric circuit board.

In one or more embodiment, the third circuit board is a printed circuit board.

In one or more embodiment, the second electric connector and the third electric connector are terminal assemblies independently disposed on the signal coupling card or card edge connectors of the signal coupling card.

In one or more embodiment, the first circuit board of the first riser card and the second circuit board of the second riser card are disposed in parallel, the third circuit board of the signal coupling card is perpendicular to the first circuit board and the second circuit board.

In one or more embodiment, the main socket is located at an edge of the mainboard, and the third circuit board and the mainboard are disposed in parallel.

In one or more embodiment, the third circuit board does not overlap the mainboard.

In one or more embodiment, an opening of the extending socket in a direction away from the mainboard.

In this disclosure, a signal transmission path between the first electric connector of the first riser card and the third electric connector of the signal coupling card is formed, and the signal transmission path between the first electric connector and the extending socket is extended through the approach proposed by this disclosure.

BRIEF DESCRIPTION OF THE DRAWINGS

This disclosure will become more fully understood from the detailed description given herein below for illustration only, and thus not limitative of this disclosure, wherein.

DETAILED DESCRIPTION

Figure 1:
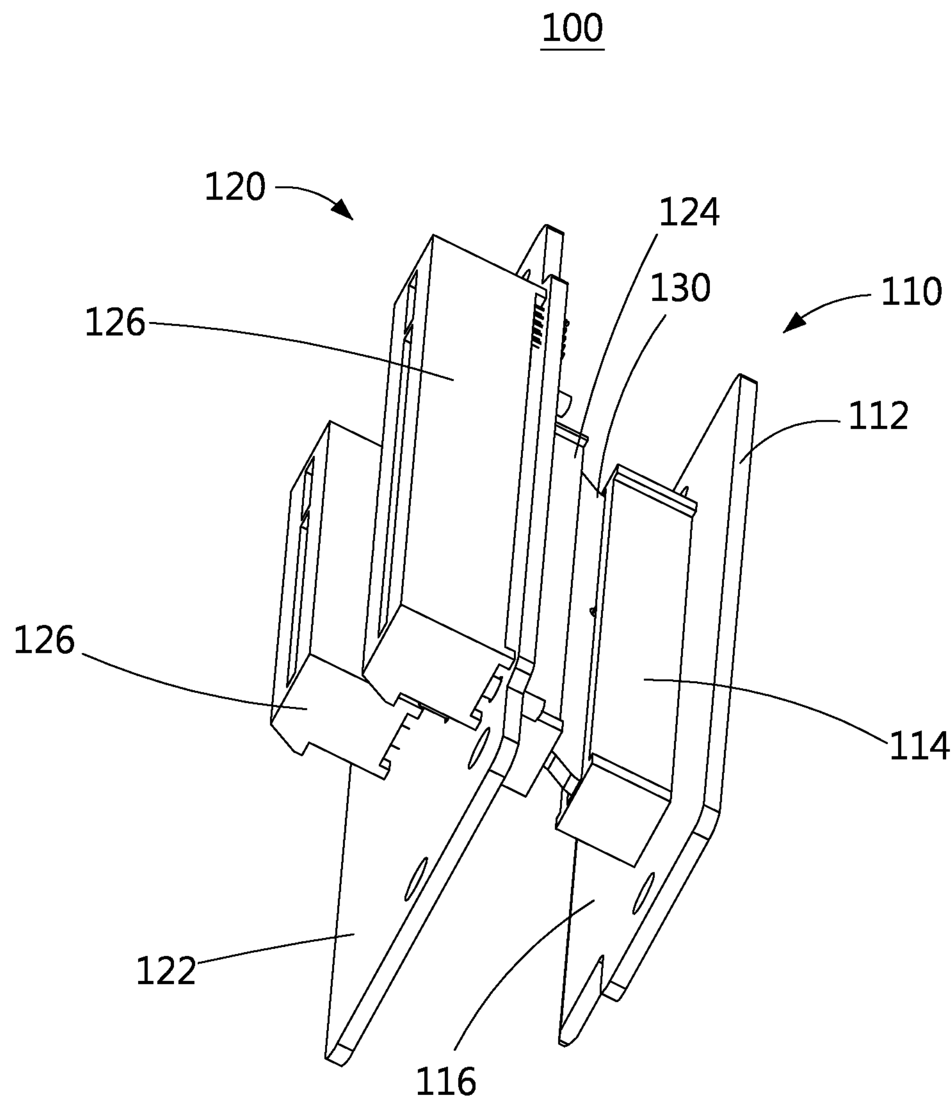
FIG. 1 is a perspective view of an extending device for signal transmission in accordance with a first embodiment.
Figure 2:
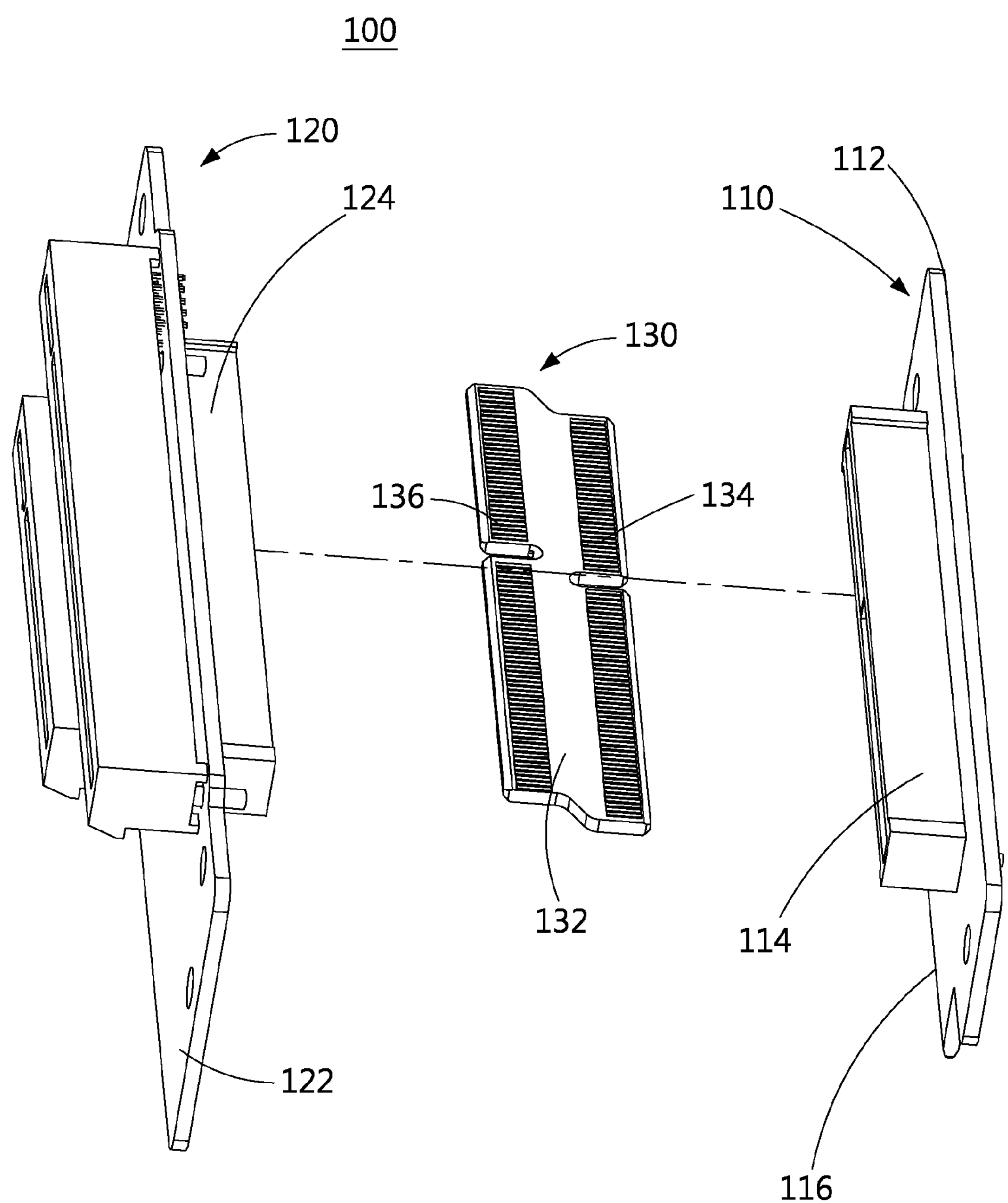
FIG. 2 is an exploded view of the extending device for signal transmission in accordance with the first embodiment.

Refer to FIG. 1 and FIG. 2, an extending device 100 for signal transmission of a first embodiment includes a first riser card 110, a signal coupling card 130, and a second riser card 120.

Refer to FIG. 1 and FIG. 2, the first riser card 110 includes a first circuit board 112, a first electric socket 114, and a first electric connector 116.

The first electric socket 114 is disposed on a side surface of the first circuit board 112. The first electric connector 116 is disposed at an edge of the first electric circuit board 112 and is electrically connected to first electric socket 114 via the circuit that the first circuit board 112 provides. The first electric socket 114 set forth includes, but not limited to, PCI, AGP, PCIE, ATA, SATA socket or the combination thereof. Terminal pins of the first electric connector 116 are correspondence with the communication protocol of the first electric socket 114. In one example, the first electric connector 116 is a terminal assembly independently disposed on the first circuit board 112; in other example, first electric connector 116 a card edge connector of the first circuit board 112. The first electric connector 116 is used to insert into to a main socket 210 of a mainboard 200, while the communication protocol of the main socket 210 is the same with that of the first electric socket 114.

Refer to FIG. 2, the signal coupling card 130 includes a third circuit board 132, a second electric connector 134, and a third electric connector 136. The third circuit board 132 is a printed circuit board which is rigid for the purpose of giving support. The third circuit board 132 is equipped with metalized layers for constructing signal transmission circuit having good signal transmission performance and reducing signal attenuation and interference.

The second electric connector 134 and the third electric connector 136 are respectively disposed on two opposite edges of the third circuit board 132, and the second electric connector 134 is electrically connected to the third electric connector 136 via the third circuit board 132. The second electric connector 134 is used to insert into the first electric socket 114. Similarly, the second electric connector 134 and the third electric connector 136 can be disposed terminal assemblies independently disposed on the signal coupling card 130 or card edge connectors of the signal coupling card 130.

Refer to FIG. 2, the second riser card 120 includes a second circuit board 122, a second electric socket 124, and one or more extending sockets 126. The second electric socket 124 and the extending sockets 126 are respectively disposed on both side surfaces of the second circuit board 122, the third electric connector 136 is used to insert into the second electric socket 124, and the extending sockets 126 are electrically connected to the second electric socket 124.

The extend device 100 can be equipped with one or more extending socket 126. For example, the extend device 100 in this embodiment includes two extending sockets 126, in which the two extending sockets can be identical or in the different types. For example, the two extending sockets 126 are identical in the condition that the main socket 210 of the mainboard 210 only supports one communication protocol; on the other hand, the two extending sockets 126 respectively supports two different communication protocols in the case that the main socket 210 supports the combination of two different communication protocols. The communication protocols set forth includes, but not limited to, PCI, AGP, PCIE, ATA or SATA.

Refer to FIG. 1, through the combination set forth, the first circuit board 112 of the first riser card 110 and the second circuit board 122 of the second riser card 120 are disposed in parallel, the third circuit board 132 of the signal coupling card 130 is perpendicular to the first circuit board 112 and the second circuit board 122.

A signal transmission path between the first electric connector 116 of the first riser card 110 and the third electric connector 136 of the signal coupling card 130 is formed. Therefore, the object to extend the signal transmission path between the first electric connector 116 and the extending sockets 126 is achieved.

The extending sockets 126 can be inserted by different types of expansion cards, so that the connection between expansion cards and the mainboard 200 can be extended by the extending device 100 for signal transmission. In particular, in the art the expansion cards are perpendicular to the mainboard 200 when inserting into the main socket 210 and the height of expansion cards is restricted by the height of the computer chassis. For example, if the computer chassis is a low-profile chassis, such as a 1U server chassis, the height of expansion cards is extremely restricted. In the embodiments of this disclosure, the expansion cards are turned to be parallel to the mainboard 200 via this extending device 100 and extend beyond the mainboard 200 partially, thus the height of expansion cards will not be restricted by the height of the chassis. Furthermore, the third circuit board 132 of the signal coupling card 130 is a printed circuit board, which provides a well signal transmission and reduces signal attenuation and interference.

Figure 3:
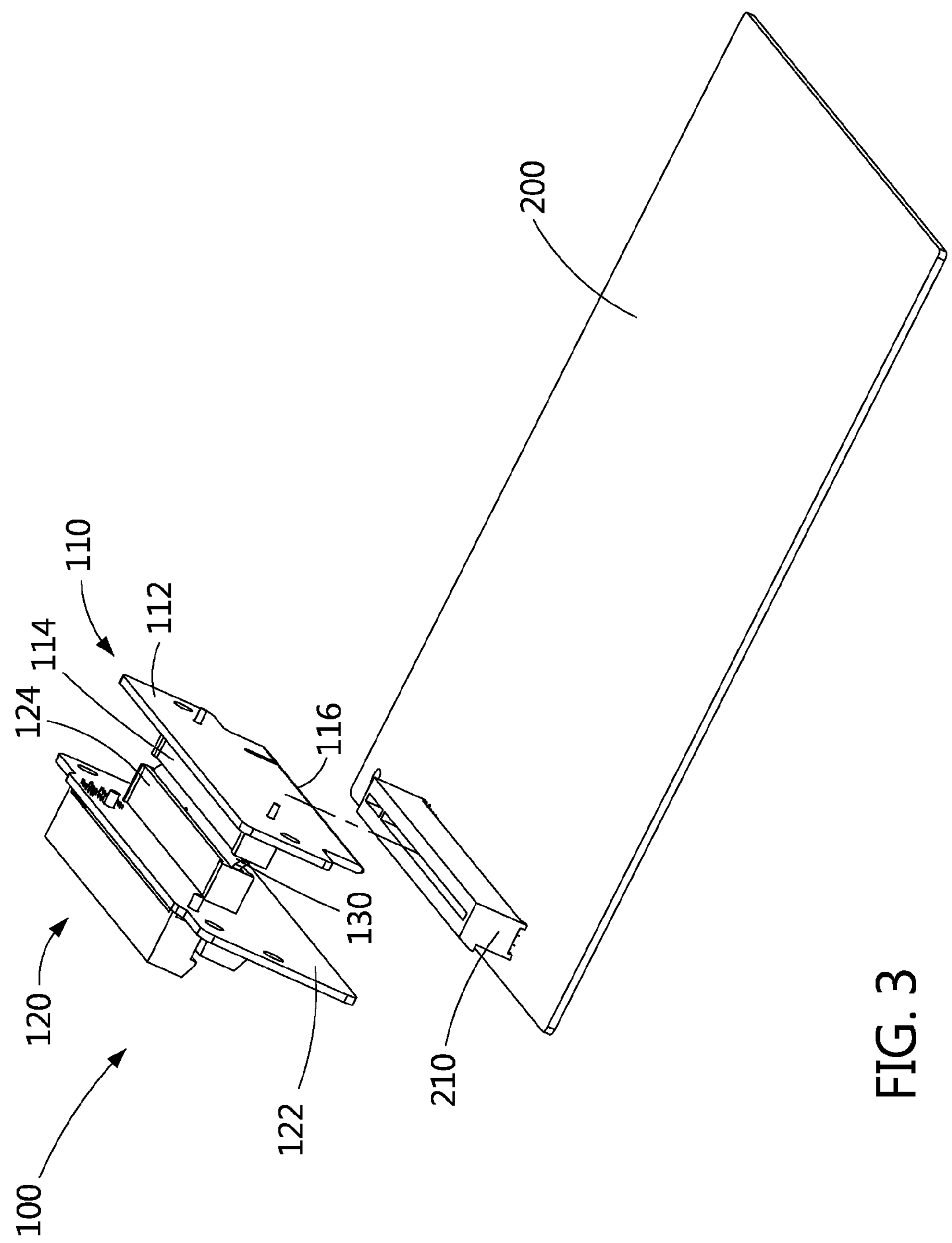
FIG. 3 is perspective view of a mainboard assembly in accordance with a second embodiment.

Refer to FIG. 3, a mainboard assembly of a second embodiment includes a mainboard 200 and an extending device 100 for signal transmission.

The mainboard 200 includes a main socket 210 and other electronic components of the mainboard 200. The electronic components set forth include central processing unit sockets, memory sockets, interfaces of storage device, system chips and so on. The electronic components and basic architecture of the mainboard 200 of this disclosure are is a part of the art and well known by a person ordinarily skilled, the detail will not be omitted hereinafter.

The extending device 100 for signal transmission include a first riser card 110, a signal coupling card 130, and a second riser card 120. The features of the extending device 100 of this embodiment are identical to that of the first embodiment, the first electric connector 116 of the first riser card 110 is used to insert into the main socket 210 of the mainboard 200 and extends the ports that the main socket 210 provides to the extending socket 126.

Furthermore, the main socket 210 is disposed at the edge of the mainboard 200. The third circuit board 132 is arranged in parallel to the mainboard 200 and is extended in the direction that away from the mainboard 200, so that the second riser card 120 that contacts to the third circuit board 132 (the coupling card 130) will not overlap the mainboard 200, and an opening of the extending socket 126 is in a direction that away from the mainboard 200 as well. On the other word, while the expansion card inserts into the extending socket 126 of the second riser card 120, the expansion card extends beyond the mainboard 200 rather than reclose above the mainboard 200. Hence, it has no necessary to partially remove the PCB of the mainboard 200 to evade the expansion card because the mainboard 200 is not located below the expansion card. For example, in the art when an expansion card is a graphics card, the PCB of mainboard 200 has to be partially removed to evade GPU chip for the purpose of configuring a cooling component like a radiator. In this disclosure, the graphics card extends beyond the mainboard 200, thus it has no necessary to cutoff or partially remove PCB of the mainboard 200. On the other word, the mainboard 200 can be a standard and universal mainboard instead of customized one.

The mainboard assembly set forth can be fit for a low-profile chassis, such as a 1U server chassis. The expansion cards are turned to be in parallel to the mainboard 200 via this extending device for signal transmission. Hence, the height of expansion cards will not be restricted by the low-profile chassis.

The third circuit board 132 of the signal coupling card 130 is a printed circuit board, which provides a well signal transmission and reduces signal attenuation and interference.

What is claimed is:

1. An extending device for signal transmission, comprising:

a first riser card, including a first circuit board, a first electric socket, and a first electric connector; wherein the first electric socket is disposed on a side surface of the first circuit board, the first electric connector is disposed at an edge of the first electric circuit board for inserting into a main socket of a mainboard;

a signal coupling card, including a third circuit board, a second electric connector, and a third electric connector; wherein the second electric connector and the third electric connector are respectively disposed on two opposite edges of the third circuit board, the second electric connector electrically connected to the third electric connector via the third circuit board, the second electric connector is for inserting into the first electric socket, the third circuit board and the mainboard are arranged in parallel; and a second riser card, including a second circuit board, a second electric socket, and at least one extending socket; wherein the second electric socket and the extending socket are respectively disposed on both side surfaces of the second circuit board, the third electric connector of the signal coupling card is for inserting into the second electric socket, and the extending socket is electrically connected to the second electric socket.

2. The extending device for signal transmission of claim 1, wherein the first electric connector is a terminal assembly independently disposed on the first electric circuit board, or a card edge connector of the first electric circuit board.

3. The extending device for signal transmission of claim 1, wherein the third circuit board is a printed circuit board.

4. The extending device for signal transmission of claim 1, wherein the second electric connector and the third electric connector are terminal assemblies independently disposed on the signal coupling card or card edge connectors of the signal coupling card.

5. The extending device for signal transmission of claim 1, wherein the first circuit board of the first riser card and the second circuit board of the second riser card are arranged in parallel, and the third circuit board of the signal coupling card is perpendicular to the first circuit board and the second circuit board.

6. An mainboard assembly, comprising:

a mainboard, including a main socket; and an extending device for signal transmission, comprising:

a first riser card, including a first circuit board, a first electric socket, and a first electric connector; wherein the first electric socket is disposed on a side surface of the first electric connector, and the first electric connector is disposed at an edge of the first circuit board for inserting into the main socket;

a signal coupling card, including a third circuit board, a second electric connector and a third electric connector; wherein the second electric connector and the third electric connector are respectively disposed at two opposite edges of the third circuit board, and the second electric connector is electrically connected to the third electric connector via the third circuit board, the third circuit board and the mainboard are arranged in parallel; and a second riser card including a second circuit board, a second electric socket and at least one extending sockets; wherein the second electric socket and the extending sockets are respectively disposed on both side surfaces of the second circuit board, the third electric connector is for inserting into the second electric socket, and the extending sockets are electrically connected to the second electric socket.

7. The main board assembly of claim 6, wherein the first electric connector is a terminal assembly independently disposed on the first electric circuit board or a card edge connector of the first electric circuit board.

8. The mainboard assembly of claim 6, wherein the third circuit board is a printed circuit board.

9. The main board assembly of claim 6, wherein the second electric connector and the third electric connector are terminal assemblies disposed on the signal coupling card or card edge connectors of the signal coupling card.

10. The mainboard assembly of claim 6, wherein the first circuit board of the first riser card and the second circuit board of the second riser card are arranged in parallel, the third circuit board of the signal coupling card is perpendicular to the first circuit board and the second circuit board.

11. The mainboard assembly of claim 10, wherein the main socket is located at an edge of the mainboard.

12. The mainboard assembly of claim 11, wherein the third circuit board does not overlapping the mainboard.

13. The main board assembly of claim 12, wherein an opening of the extending socket in a direction away from the mainboard.

* * * * *